May 23, 1939.　　B. J. KLEERUP　　2,159,616

IMAGE PROJECTION DEVICE

Filed April 26, 1937　　2 Sheets-Sheet 1

Inventor:
Bertel J. Kleerup
By: A. Trevor Jones
Atty.

May 23, 1939.  B. J. KLEERUP  2,159,616
IMAGE PROJECTION DEVICE
Filed April 26, 1937   2 Sheets-Sheet 2
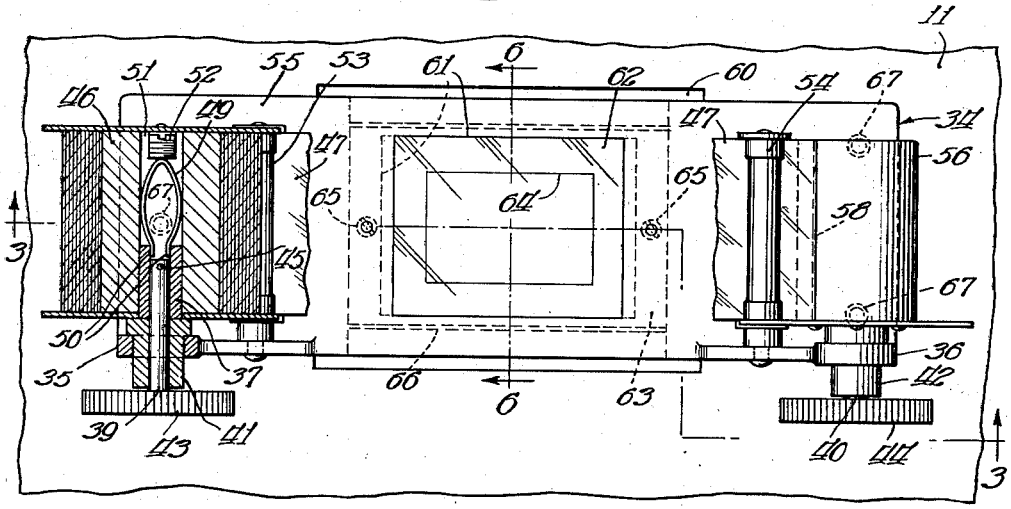
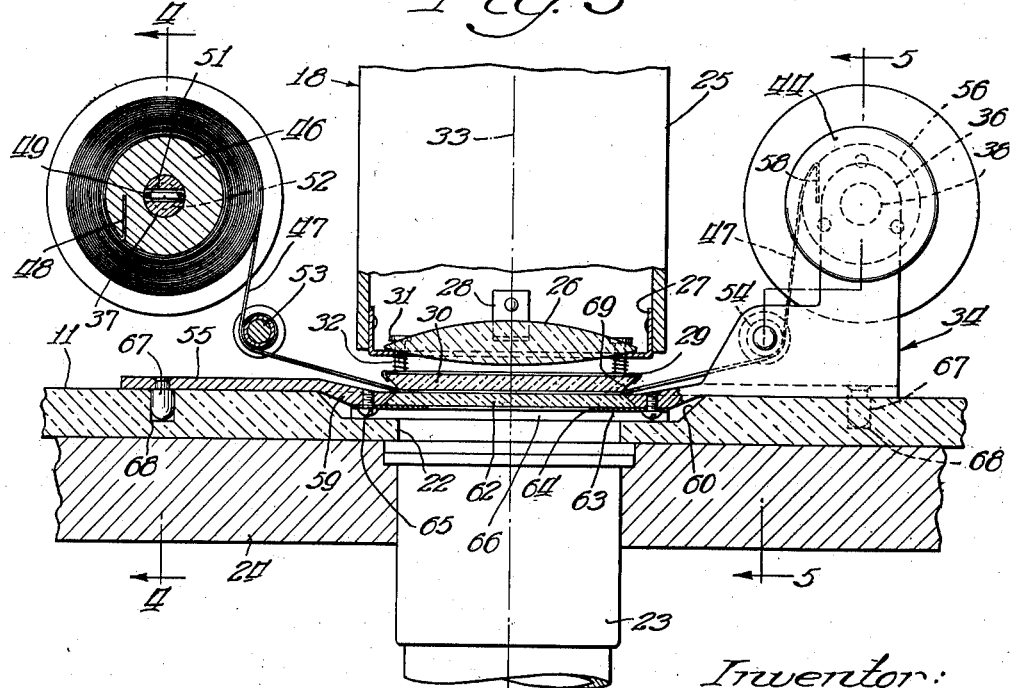
Inventor:
Bertel J. Kleerup
By: A. Trevor Jones
Atty.

Patented May 23, 1939

2,159,616

UNITED STATES PATENT OFFICE 2,159,616

IMAGE PROJECTION DEVICE

Bertel J. Kleerup, Chicago, Ill., assignor to Hamilton Manufacturing Company, Two Rivers, Wis., a corporation of Wisconsin Application April 26, 1937, Serial No. 138,882

1 Claim. (Cl. 88—24)

This invention relates to an image projection device more particularly for projecting strip film for scientific or educational purposes.

The invention is of particular utility embodied, as here shown, in a portable cabinet, for use by dentists to display to their patients enlargements of film pictures illustrating, for example, the proper care of the teeth. The image projection method and means broadly disclosed herein is covered in a pending application filed April 10, 1937, Ser. No. 136,088, by Howell G. Evans and the present applicant jointly. The present application discloses a device which is peculiarly adapted to be used in conjunction with the projector of said joint application.

Among other objects, the present invention provides, in combination with a horizontal surface having an aperture therein and a projector having operative parts mounted above and below said surface in register with said aperture, reel means for moving a strip film across the aperture for projection purposes, the surface itself providing a support for the reel means, the latter being readily separable therefrom so as to permit the display of other types of films when so desired.

Other objects and advantages will be apparent from the following description, taken together with the accompanying drawings, in which:—

Figure 2 is an enlarged plan view of a portion of the cabinet upper surface with the reel means associated therewith, parts being shown in section and the projector lantern being omitted;

Figure 3 is a partially sectional view, taken on the line 3—3 of Fig. 2 with the projector lantern in position, parts being shown in elevation;

Figure 1:
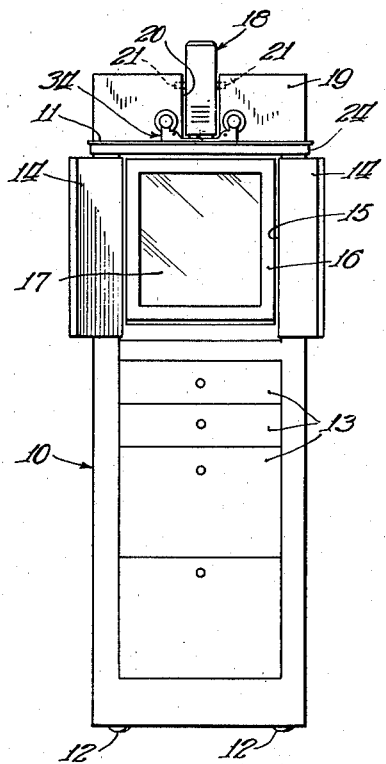
Figure 1 is a general view showing the present invention associated with the preferred cabinet.
Figure 4:
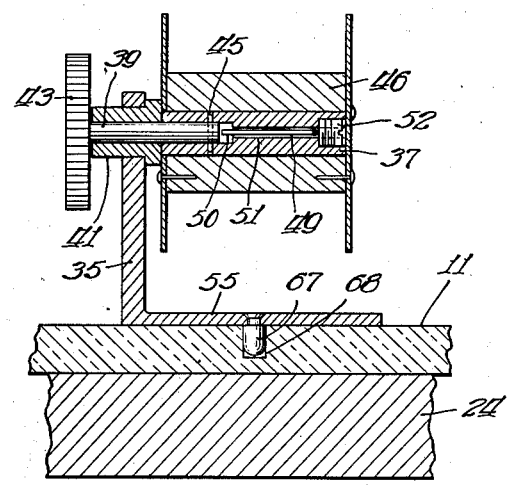
Figure 4 is a cross-section taken on the line 4—4 of Fig. 3.
Figure 5:
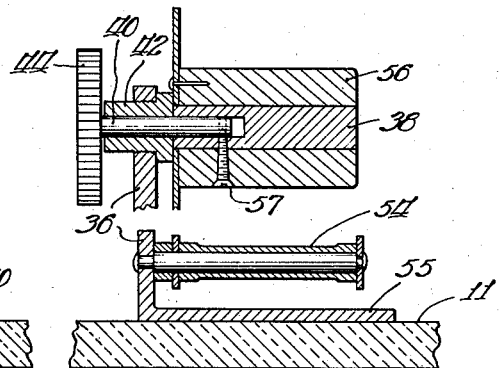
Figure 5 is a similar cross-section taken on the line 5—5 of Fig. 3.

Referring in detail to the illustrative construction shown in the drawings, the cabinet 10, preferably of ornamental design, is of such a height that its upper surface 11 is a convenient working surface for a person of average height when standing, the cabinet being otherwise in proportion so that it may be readily moved by the dentist, with the aid of castors 12, from a position against a wall, to a position in front of the patient seated in the usual dental operating chair. Since only the upper part of the cabinet need be utilized for the present invention, the lower part thereof may contain the usual drawers 13, for the convenience of the dentist, some of which may contain the films or other pictures to be displayed.

The cabinet 10 is preferably specifically constructed in accordance with the disclosures of said pending joint application, reference to which may be had for details thereof. For purposes of the present invention, it will suffice to say that the cabinet, adjacent its upper front, has a pair of swinging doors 14 which may be opened to discover the interior 15 of the cabinet in which is mounted a frame 16 carrying a translucent screen 17, through the rear side of which, by a system of mirrors (not here shown), a beam of light carrying the enlarged image is projected.

The projector lantern 18 is carried by the cabinet 10 to move toward and away from the surface 11, for which purpose it may be suitably hinged thereto adjacent the upwardly continued rear wall 19 of the cabinet, an opening 20 in said wall permitting movement of the projector lantern as just described. Stops 21 on the back of the lantern 18, by contacting with the rear surface of the wall 19, limit forward rotative movement of the lantern.

The surface 11 and upper wall of the cabinet has an aperture 22 therein, in register with which, when rotated to operative position shown in Figs. 1 and 3, the projector lantern is disposed, as well as the objective lens barrel 23 of the projector, the latter being carried by the upper wall 24 of the cabinet directly below the aperture 22. The housing 25 of the projector lantern contains at its lower end a condenser lens 26 secured therein in the usual manner, for example, as by a frame 27 and lug 28. Depending resiliently from the frame 27 is another frame 29 which carries a glass plate 30. As here shown, headed studs 31 pass through the frame 27 and are attached to the depending frame 29, the studs 31 being free to move in the frame 27 and being normally pressed downwardly as limited by their heads by light compression coil springs 32 to urge the glass plate 30 toward or into the aperture 22. Through the projector parts just described, including the aperture 22, is thus projected a light beam represented by the broken line 33, all as more fully described in said co-pending joint application.

In accordance with the present invention, supported on the surface 11; and, when in position thereon, forming an operative part thereof, is the reel means comprising a carriage 34 for the strip film to be displayed, the carriage with the film thereon being selectively separable from the surface 11 and other projector parts. For this purpose, revolubly mounted on upstanding portions 35 and 36 at each end respectively of the carriage 34 are spool supports 37 and 38. As here shown, these spool supports are keyed to shafts 39 and 40 respectively which turn in bushings 41 and 42 threadedly received in the upstanding portions 36. Knurled knobs 43 and 44, rigid with the shafts 39 and 40 respectively permit manual rotation of the spool supports. It will be understood that the spool supports are thus mounted at one end only in cantilever arrangement on said upstanding portions.

The cross-pin 45 keys the spool support 37 to the shaft 39, frictional abutment of the knob 43 at one end and the spool support 37 at the other end with the bushing 41 limiting axial movement of the shaft in the bushing.

In this instance the spool 46 is removable from the spool support 37, and may constitute the spool upon which the strip film 47 is normally permanently reeled, the film being secured to this spool as at 48, as by the insertion of the end of the film strip in a corresponding groove in the spool, where it is frictionally retained, as is well known in the art.

Having selected the desired film to be displayed, such as the film 47, the dentist slips the spool 46 carrying this film onto its spool support 37 which is at one end of the carriage 34, and preferably at the lefthand of a person facing the cabinet. The spool 46 is caused to rotate with its spool support 37, in this instance by a spring detent 49. This may be in the form of a wire loop which has both ends anchored as at 50 axially of the spool support 37 in the bore for the shaft 39 (which terminates short of the end of the bore) and at one end of a radially and longitudinally opening slot 51 therein, communicating with the bore. A set screw 52 carried by the spool support 37 at the end of the slot 50 opposite the end in which the wire spring 49 is anchored, abuts the outer end of the spring, and, when screwed home against the bight of the spring, holds the spring in position (and also, if desired, presses the sides thereof slightly outwardly in the slot 51) to have resilient friction engagement with the bore of the spool 46, thus normally causing the spool to turn with the shaft 39.

The free end of the strip film 47 is then led, desirably with the aid of guide rollers 53 and 54, along the film track provided by the plate portion 55 of the carriage 34, crossing the aperture 22, while the carriage is in position thereover as presently described, the film being thereafter temporarily reeled upon another spool 56 which may be permanently secured to its spool support as by a screw 57 passing through the spool support 38 and into engagement with the shaft 40. The free end 58 of the film is temporarily inserted in a suitable groove in the spool 56, which, when the spool has made one revolution with the film thereabout, prevents slippage of the film with respect to the spool.

Centrally of the carriage 34, the plate portion 55 thereof is desirably offset downwardly as at 59 to be received in a countersunk enlargement 60 of the aperture 22. This downwardly offset portion 59 of the carriage has a central cut-out 61 therein which is closed by a glass plate 62, a chamfered edge of the glass plate 62 at each end of the cut-out 61 engaging an inclined undercut margin of the cut-out 61. Thereafter, to retain the plate 62 in position, a mask 63 having the central cut-out 64 is secured as by screws 65 to the bottom face of the offset portion 59 and within a longitudinally extending recess 66 therein.

Figure 6:
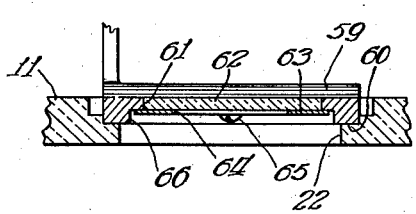
Figure 6 is another cross-section taken on the line 6—6 of Fig. 2.

The downwardly offset portion 59 of the carriage may fit somewhat snugly into a portion of the countersink 60 made to receive it as best shown in Figs. 3 and 6.

Also downwardly depending pins 67 at each end of the carriage, received in suitably registering holes 68 in the surface 11, may assist in locating the carriage in position as described. It will be understood that the projector lantern may be temporarily swung backwardly upon its pivot, when the reel carriage is placed in or removed from position, and the lantern then moved back to operative position as shown.

When the projector lantern 18 is in operative position as shown, and the film 47 is threaded about the spools and guide rollers as just described, the upper glass plate 30 presses against the glass plate 62 that part of the film which is between these glass plates and thus diverts the film which is between the rollers 53 and 54 downwardly to follow its track at a fixed distance from the lens system of the lens barrel 23 for proper projection purposes. The offset portion 59 of the carriage is arranged so that the upper surface of the glass plate 62 is in the plane of the surface 11, the lens system 23 being arranged for proper projection of a film in this plane, as will be readily understood by those skilled in the art.

So constructed and arranged, the dentist or other operator may reel the film through the device, first from the spool 46 which is permanent with the film, onto the spool 56 which is permanent with the carriage, the film passing progressively, rapidly or slowly as the dentist may desire, controlled by manual rotation of the knob 44, through the projector. The usual light source being energized, the pictures on the strip film 47 are successively displayed on the screen 17. A beveled edge 69 on the upper glass plate 30 prevents scraping of the film by this plate and provides somewhat in the nature of a cam action which causes the upper glass plate 30 to resiliently adapt itself to the thickness of the film while still pressing the film against the lower glass plate to maintain the proper distance from the objective lens.

When all of the pictures on the strip have been displayed, the dentist, by manipulating the knob 43, may re-reel the film back onto the spool 46 and remove this spool with the film thereon for storage or for replacement by another spool with a different film thereon.

It will be understood that the invention is not limited to details of construction here described for purposes of exemplification. Such changes may be made as fall within the scope of the following claim without departing from the invention.

Having described my invention, I claim:

In an image projection device for use with a horizontal flat working surface and a projection lantern mounted to swing into and out of register over an aperture in the surface, the combination with a downwardly spring pressed glass plate carried by the lantern for register with said aperture, of a unitary film carriage separable from the cabinet and lantern, said carriage comprising reel means including rotatable spool supports for a strip film reeled thereon and a frame carrying said spool supports upstanding thereon, said frame having a flat plate portion extending horizontally beneath the reels and including a central portion between the reels which is downwardly offset out of the main plane of the frame, the lower face of said downwardly offset portion providing registering means receivable in said aperture for registering the carriage thereover and the upper surface thereof providing a track for the film in substantially the plane of the said working surface when the film is pressed against said upper face of the downwardly offset portion by the said glass plate carried by the projector lantern, said downwardly offset portion being cut out centrally to provide a frame for and carrying another glass plate flush with said offset portion and also in register with said aperture when the carriage is placed in position as described.

BERTEL J. KLEERUP.